(12) United States Patent
Tazawa

(10) Patent No.: US 8,923,020 B2
(45) Date of Patent: Dec. 30, 2014

(54) SWITCHING POWER SUPPLY CIRCUIT HAVING SHUNT REGULATOR WITH SWITCHABLE GAIN

(75) Inventor: Takeshi Tazawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 44 days.

(21) Appl. No.: 13/824,744

(22) PCT Filed: Jul. 10, 2012

(86) PCT No.: PCT/JP2012/004453
§ 371 (c)(1),
(2), (4) Date: Mar. 18, 2013

(87) PCT Pub. No.: WO2013/105150
PCT Pub. Date: Jul. 18, 2013

(65) Prior Publication Data
US 2014/0185332 A1 Jul. 3, 2014

(30) Foreign Application Priority Data

Jan. 11, 2012 (JP) .................................. 2012-002728

(51) Int. Cl.
*H02M 3/335* (2006.01)
*H02M 1/00* (2006.01)

(52) U.S. Cl.
CPC ...... *H02M 3/33553* (2013.01); *H02M 3/33523* (2013.01); *H02M 2001/0032* (2013.01)
USPC ................... 363/21.07; 363/21.12; 363/21.15

(58) Field of Classification Search
USPC ....................................... 363/16, 21.01–21.18
See application file for complete search history.

(56) References Cited

U.S. PATENT DOCUMENTS 5,901,051 A * 5/1999 Takahashi et al. .......... 363/21.18
5,905,491 A * 5/1999 Kim .............................. 345/212

(Continued)

FOREIGN PATENT DOCUMENTS

JP 01-133272 5/1989
JP 07-163143 6/1995

(Continued)

OTHER PUBLICATIONS

International Search Report for corresponding International Application No. PCT/JP2012/004453 mailed Sep. 11, 2012 (English translation provided; previously listed on IDS submitted on Mar. 18, 2013 with application).

(Continued)

*Primary Examiner* — Timothy J Dole
*Assistant Examiner* — Yusef Ahmed
(74) *Attorney, Agent, or Firm* — Renner, Otto, Boisselle & Sklar, LLP

(57) ABSTRACT

A switching power supply circuit (101) includes a first rectifier circuit (102) converting an alternate current to a direct current, a switching operator (20), a switching transformer (103) including a primary coil supplied with a switched current and a secondary coil inducing power corresponding to the current, a second rectifier circuit (30) rectifying the power induced by the secondary coil, and a control circuit (40) changing a ratio of a current flowing to a photocoupler (107) to an output voltage from the second rectifier circuit (30) in a standby mode and in a power-on mode to reduce a noise of the switching transformer in each of the modes.

3 Claims, 3 Drawing Sheets

(56) References Cited

U.S. PATENT DOCUMENTS

| | | | |
|---|---|---|---|
| 6,028,776 A * | 2/2000 | Ji et al. | 363/21.05 |
| 6,088,243 A * | 7/2000 | Shin | 363/21.05 |
| 6,160,720 A * | 12/2000 | Nishida et al. | 363/19 |
| 6,252,783 B1 * | 6/2001 | Huh et al. | 363/21.01 |
| 6,285,566 B1 * | 9/2001 | Nakahira et al. | 363/19 |
| 6,295,217 B1 * | 9/2001 | Yang et al. | 363/49 |
| 6,430,062 B1 * | 8/2002 | Shin | 363/21.01 |
| 6,674,271 B2 * | 1/2004 | Choo et al. | 323/282 |
| 6,822,646 B2 * | 11/2004 | Kang | 345/212 |
| 6,952,355 B2 * | 10/2005 | Riggio et al. | 363/21.15 |
| 7,154,762 B2 * | 12/2006 | Furukoshi et al. | 363/16 |
| 8,520,414 B2 * | 8/2013 | Garrity et al. | 363/21.14 |
| 2001/0007529 A1 * | 7/2001 | Nishida et al. | 363/19 |
| 2002/0036910 A1 * | 3/2002 | Yang | 363/21.07 |
| 2002/0196642 A1 * | 12/2002 | Goder et al. | 363/21.11 |
| 2003/0214819 A1 * | 11/2003 | Nakagawa | 363/20 |
| 2004/0218405 A1 * | 11/2004 | Yamada et al. | 363/18 |
| 2005/0007088 A1 * | 1/2005 | Yang et al. | 323/283 |
| 2007/0253228 A1 * | 11/2007 | Morota et al. | 363/21.12 |
| 2008/0298095 A1 * | 12/2008 | Chuang et al. | 363/21.12 |
| 2009/0116265 A1 * | 5/2009 | Saji | 363/37 |
| 2009/0284994 A1 * | 11/2009 | Lin et al. | 363/21.13 |
| 2010/0008109 A1 * | 1/2010 | Morota | 363/21.16 |
| 2010/0073351 A1 * | 3/2010 | Lin et al. | 345/212 |
| 2010/0149840 A1 * | 6/2010 | Hayasaki et al. | 363/21.09 |
| 2010/0232186 A1 * | 9/2010 | Nakata | 363/21.12 |
| 2010/0315841 A1 * | 12/2010 | Saji | 363/21.12 |
| 2011/0311260 A1 * | 12/2011 | Nakajima et al. | 399/88 |
| 2012/0008346 A1 * | 1/2012 | Kawamura | 363/21.15 |
| 2012/0014145 A1 * | 1/2012 | Koike | 363/49 |
| 2012/0127760 A1 * | 5/2012 | Hosono | 363/21.01 |
| 2012/0140530 A1 * | 6/2012 | Nemoto | 363/21.12 |
| 2012/0262950 A1 * | 10/2012 | Nate et al. | 363/16 |
| 2013/0088898 A1 * | 4/2013 | Gao et al. | 363/21.16 |

FOREIGN PATENT DOCUMENTS

| | | |
|---|---|---|
| JP | 2000-184709 A | 6/2000 |
| JP | 2000-209524 A | 7/2000 |
| JP | 2002-051546 A | 2/2002 |
| JP | 2002-084751 A | 3/2002 |
| JP | 3095238 | 4/2003 |
| JP | 2006-050760 A | 2/2008 |
| JP | 2010-206982 A | 9/2010 |

OTHER PUBLICATIONS

International Search Report for corresponding International Application No. PCT/JP2012/004453 mailed Sep. 11, 2012.
Form PCT/ISA/237 for corresponding International Application No. PCT/JP2012/004453 dated Sep. 11, 2012.

\* cited by examiner (a) STANDBY MODE (b) POWER-ON MODE

SWITCHING POWER SUPPLY CIRCUIT HAVING SHUNT REGULATOR WITH SWITCHABLE GAIN

TECHNICAL FIELD

The present invention relates to switching power supply circuits used for audio systems, etc., and more particularly to switching power supply circuits having a standby mode.

BACKGROUND ART

In recent years, lower power consumption of electronic devices has been required. In a switching power supply circuit used as a power supply of an electronic device, power consumption can be lowered by controlling the switching operation of a switching element. As a conventional switching power supply circuit, a suggested technique reduces the switching frequency of a switching element in a standby mode, thereby reducing power consumption and an abnormal harsh noise (e.g., a buzz) of a transformer (see, for example, Patent Document 1).

CITATION LIST

Patent Document

PATENT DOCUMENT 1: Japanese Utility Model Registration No. 3095238

SUMMARY OF THE INVENTION

Technical Problem

However, while the conventional technique reduces the buzz of the transformer when the switching power supply circuit is in the standby mode, the switching frequency of the switching element is within an audible frequency range in a power-on mode. That is, the conventional switching power supply circuit has the problem of causing a buzz in the power-on mode.

In view of the problem, it is an objective of the present invention to reduce a buzz when a switching power supply circuit is in a power-on mode in addition to a standby mode.

Solution to the Problem

In order to solve the problem, the present invention provides the following solution. For example, a switching power supply circuit converting AC power to DC power is switchable between a standby mode and a power-on mode. The circuit includes a first rectifier circuit configured to rectify the AC power and convert the AC power to a direct current; a switching operator configured to switch the current rectified by the first rectifier circuit; a switching transformer including a primary coil supplied with the current switched by the switching operator, and a secondary coil inducing power corresponding to the current supplied to the primary coil; a second rectifier circuit configured to rectify the power induced by the secondary coil of the switching transformer and output the DC power; and a control circuit including a photocoupler configured to feed back a signal from a secondary side to a primary side in accordance with a flowing current, and configured to perform feedback control of switching operation of the switching operator so that a predetermined voltage is output from the second rectifier circuit. The control circuit changes a ratio of a current flowing to the photocoupler to the voltage output from the second rectifier circuit depending on whether the switching power supply circuit is in the standby mode or in the power-on mode to reduce a noise of the switching transformer when the switching power supply circuit is in the standby mode and in the power-on mode.

With this configuration, the switching power supply circuit converts the AC power to the direct current, outputs the direct current, and is switchable between the standby mode and the power-on mode. The switching power supply circuit feeds back the signal from the secondary side to the primary side via the photocoupler, thereby controlling the switching operation. The control circuit provides different ratios of the current flowing to the photocoupler to the voltage output from the second rectifier circuit in the standby mode and in the power-on mode to reduce the noise of the switching transformer when the switching power supply circuit is in the standby mode and in the power-on mode. This reduces the noise of the switching transformer regardless of the operational mode of the switching power supply circuit.

Advantages of the Invention

The present invention reduces a noise when a switching power supply circuit is in a power-on mode in addition to a standby mode.

DESCRIPTION OF EMBODIMENTS

An embodiment of the present invention will be described hereinafter with reference to the drawings.

Figure 1:
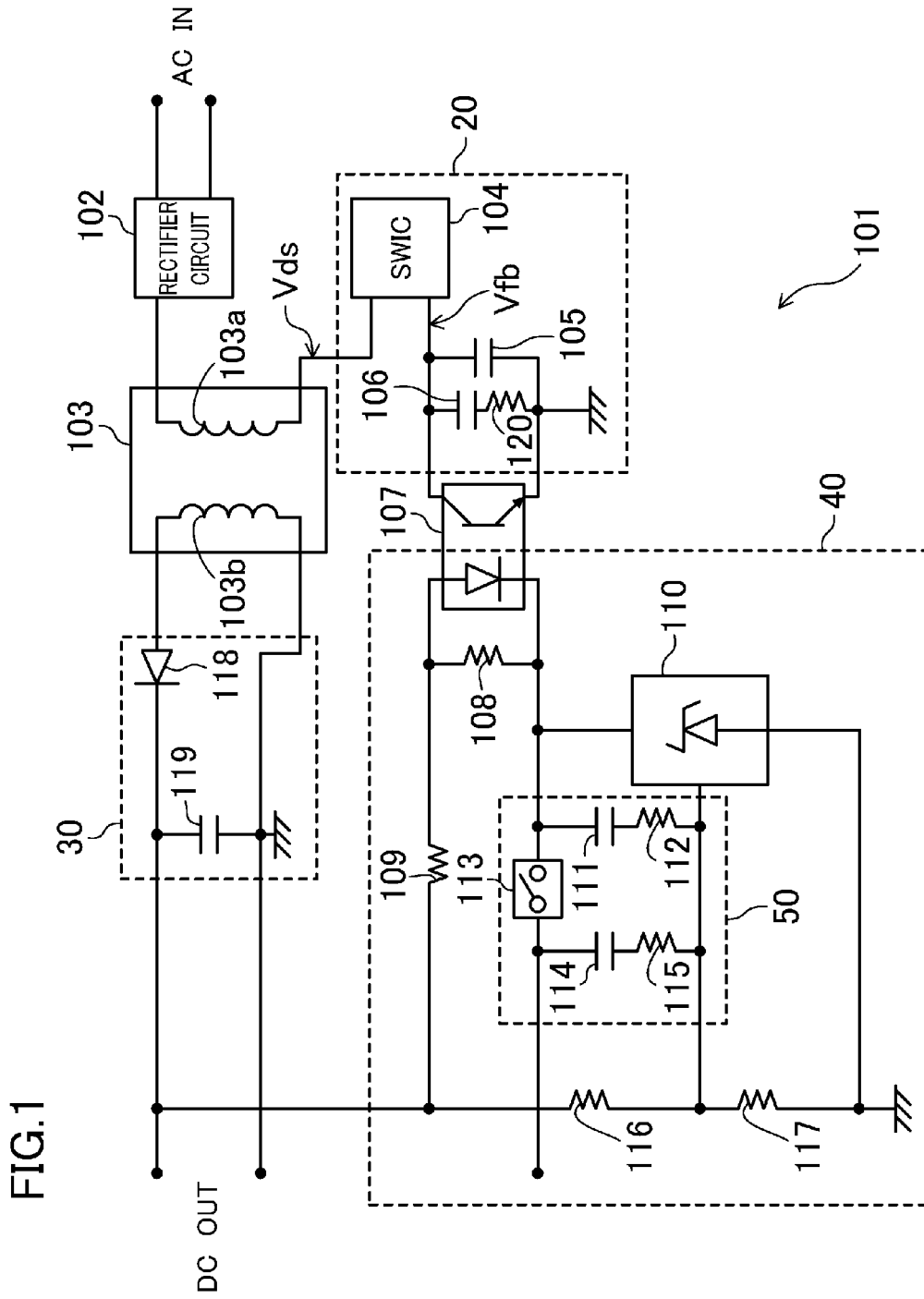
FIG. 1 illustrates the configuration of a switching power supply circuit according to an embodiment.

FIG. 1 illustrates the configuration of a switching power supply circuit according to the embodiment of the present invention. A switching power supply circuit 101 includes a first rectifier circuit 102, a switching transformer 103, a switching operator 20, a second rectifier circuit 30, and a control circuit 40, and generates output power DC, which is a direct current, from input power AC, which is an alternate current. The operational mode of the switching power supply circuit 101 is switchable between a standby mode and a power-on mode.

The first rectifier circuit 102 rectifies the input power AC such as a power input for commercial use, converts the input power AC to a direct current, and outputs the direct current.

The switching transformer 103 includes a primary coil 103a and a secondary coil 103b. The primary coil 103a is coupled between the first rectifier circuit 102 and the switching operator 20. The secondary coil 103b is coupled to the second rectifier circuit 30.

The switching operator 20 includes a switching power supply element 104, capacitors 105 and 106, and a resistive element 120. The switching power supply element 104 switches the current rectified by the first rectifier circuit 102, thereby supplying a switching current to the primary coil 103a. The power corresponding to the switching current is induced by the secondary coil 103b. The switching power supply element 104 performs switching operation based on a feedback voltage Vfb, which varies depending on a current flowing to a primary side of a photocoupler 107, which will be described later.

The second rectifier circuit 30 includes a diode 118 and a capacitor 119. Power generated at the secondary coil 103b is rectified and smoothed by the diode 118 and the capacitor 119 to be a direct current. The power, which has changed to the direct current, is supplied as the output power DC to a load coupled to an amplifier, etc. of an audio system.

The control circuit 40 feeds back a signal from the secondary side to the primary side so that the voltage output from the second rectifier circuit 30 is equal to a predetermined voltage, thereby performing feedback control of the switching operator 20. The control circuit 40 includes the photocoupler 107, a shunt regulator 110, and a gain switching circuit 50.

The photocoupler 107 includes a diode at the secondary side, and a transistor at the primary side. Resistive elements 108 and 109 are coupled between the secondary side of the photocoupler 107 and a terminal outputting the output power DC. Depending on the load supplied with the output power DC, the current flowing to the photocoupler 107 and the feedback voltage Vfb vary, thereby changing the switching frequency of the switching power supply element 104.

An anode of the shunt regulator 110 is coupled to the diode of the photocoupler 107, and a cathode is coupled to ground. The voltage, which is obtained by dividing the voltage output from the second rectifier circuit 30 with resistive elements 116 and 117, is supplied to a reference terminal of the shunt regulator 110.

The gain switching circuit 50 includes a capacitor 111, a resistive element 112, a switch 113, a capacitor 114, and a resistive element 115. On and off states of the switch 113 are controlled with a control signal from an external microcomputer, etc. (not shown). Specifically, when the switching power supply circuit 101 is in the power-on mode, the switch 113 is turned off, and when the switching power supply circuit 101 is in the standby mode, the switch 113 is turned on. When the switch 113 is off, the shunt regulator 110 is coupled to the capacitor 111 and the resistive element 112. On the other hand, when the switch 113 is on, the shunt regulator 110 is coupled to the capacitor 111 and the resistive element 112, as well as the capacitor 114 and the resistive element 115.

With this configuration, the ratio of the current flowing to the photocoupler 107 to the voltage output from the second rectifier circuit 30 is switched depending on whether the switching power supply circuit 101 is in the standby mode or in the power-on mode. Specifically, when the switch 113 is turned off, the ratio of the current flowing to the photocoupler 107 to the voltage output from the second rectifier circuit 30 decreases. That is, the gain of the shunt regulator 110 increases, and the current flowing to the photocoupler 107 decreases. On the other hand, when the switch 113 is turned on, the ratio of the current flowing to the photocoupler 107 to the voltage output from the second rectifier circuit 30 increases. That is, the gain of the shunt regulator 110 decreases, and the current flowing to the photocoupler 107 increases.

As described above, the gain of the shunt regulator 110 is switched depending on whether the switching power supply circuit 101 is in the standby mode or in the power-on mode, thereby changing the current flowing to the photocoupler 107. The feedback voltage Vfb varies depending on the current flowing to the photocoupler 107, and the switching frequency of the switching power supply element 104 is subjected to the feedback control.

Figure 2:
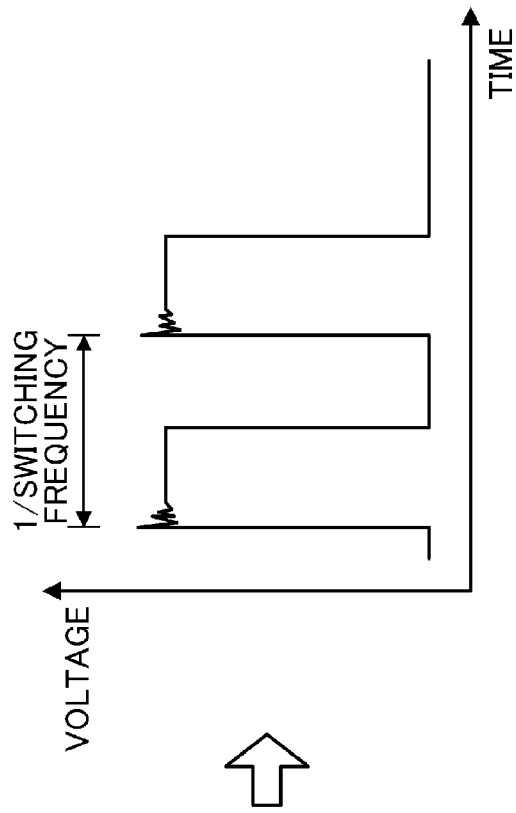
FIG. 2 illustrates the relationship between the operational mode and the switching frequency of the switching power supply circuit according to the embodiment.
Figure 2:
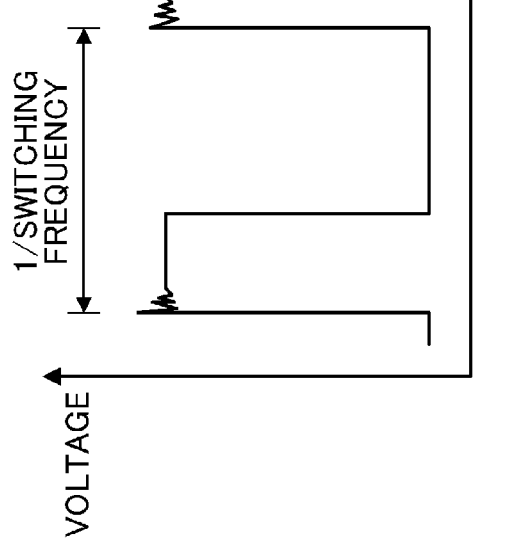

Next, the operation of the switching power supply circuit according to this embodiment will be described with reference to FIGS. 1 and 2. FIG. 2 illustrates the relationship between the operational mode and the switching frequency of the switching power supply circuit according to this embodiment. The horizontal axis represents time, and the vertical axis represents the voltage Vds supplied to the primary coil 103a.

When the switching power supply circuit 101 is in the standby mode, the switch 113 is turned on in response to the control signal indicating the standby mode. Since the switch 113 is turned on, the gain of the shunt regulator 110 decreases, and the current flowing to the photocoupler 107 increases. As a result, the feedback voltage Vfb of the switching power supply element 104 decreases, and thus, the switching power supply element 104 is controlled at the switching frequency shown in FIG. 2A.

On the other hand, when the switching power supply circuit 101 is in the power-on mode, the switch 113 is not turned on in response to the signal indicating the power-on mode. Since the switch 113 is not turned on, the gain of the shunt regulator 110 increases, and the current flowing to the photocoupler 107 decreases. As a result, the feedback voltage Vfb increases, and thus, the switching power supply element 104 is controlled at the switching frequency shown in FIG. 2B.

The switching frequency in the standby mode is controlled to 20 Hz or less, which is the lower limit of an audible frequency range (i.e., from 20 Hz to 20 kHz). The switching frequency in the power-on mode is controlled to 20 kHz or more, which is the upper limit of the audible frequency range.

In this embodiment, for example, an integrated circuit (IC) of model number STR2A155 is used as the switching power supply element 104, an IC of model number PC123X2YUPOF is used as the photocoupler 107, and an IC of model number MM1431CURE is used as the shunt regulator 110 to obtain the above-described switching frequency. In this case, for example, the capacitor 111 may have a capacity of 0.1 μF, the resistive element 112 may have a resistance of 390 kgΩ, the capacitor 114 may have a capacity of 0.1 μF, and the resistive element 115 may have a resistance of 3.3 kΩ.

Figure 3:
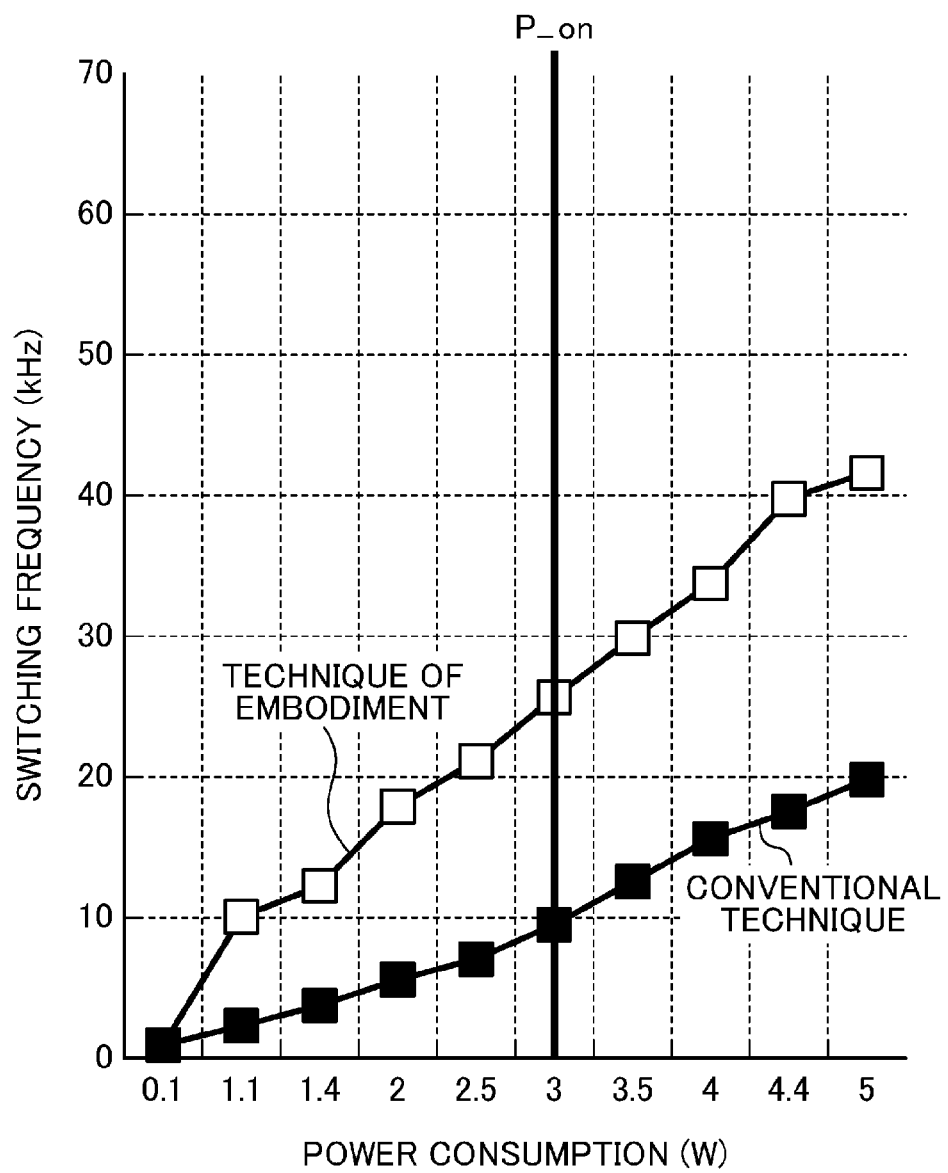
FIG. 3 is a graph for comparing advantages between the technique shown in FIG. 1 and a conventional technique.

FIG. 3 is a graph for comparing advantages between the switching power supply circuit according to this embodiment and a conventional switching power supply circuit. The horizontal axis represents power consumption, and the vertical axis represents the switching frequency. Reference character P_on indicates the state where the switching power supply circuit is powered on, and corresponds to the power-on mode.

The conventional switching power supply circuit has a power consumption of 0.05 W and a switching frequency of 20 Hz or less in the standby mode, and has a power consumption of 3.2 W and a switching frequency of 10 kHz when the switching power supply circuit is powered on, i.e., transits from the standby mode to the power-on mode. Therefore, the switching frequency is within the audible frequency range when the switching power supply circuit is powered on, thereby causing a noise.

By contrast, the switching power supply circuit 101 according to this embodiment has a power consumption of 0.05 W and a switching frequency of 20 Hz or less in the standby mode. When the switching power supply circuit 101 is powered on, the power consumption is 3.2 W and the switching frequency is 25 kHz. Therefore, regardless of whether the switching power supply circuit 101 is in the standby mode or in the power-on mode, the switching frequency is out of the audible frequency range, thereby causing less noise in the switching transformer 103 regardless of whether the switching power supply circuit 101 is in the standby mode or in the power-on mode.

As described above, in this embodiment, the switching frequency is controlled to be out of the audible frequency range in both of the standby mode and the power-on mode of the switching power supply circuit, and therefore, a noise of the transformer can be reduced regardless of the operational mode.

INDUSTRIAL APPLICABILITY

The switching power supply circuit according to the present invention reduces power consumption and a noise of the transformer in the standby mode and in the power-on mode, and is thus useful as a power supply circuit of an audio system, etc. which needs to be used in silent environment.

DESCRIPTION OF REFERENCE CHARACTERS

Switching Operator
Second Rectifier Circuit
Control Circuit
Gain Switching Circuit
101 Switching Power Supply Circuit
102 First Rectifier Circuit
103 Switching Transformer
104 Switching Element
105, 106, 111, 114, 119 Capacitors
108, 109, 112, 115, 116, 117, 120 Resistive Elements
107 Photocoupler
110 Shunt Regulator
113 Switch
118 Diode

The invention claimed is:

1. A switching power supply circuit converting AC power to DC power, and being switchable between a standby mode and a power-on mode, the circuit comprising:
   a first rectifier circuit configured to rectify the AC power and convert the AC power to a direct current;
   a switching operator configured to switch the current rectified by the first rectifier circuit;
   a switching transformer including a primary coil supplied with the current switched by the switching operator, and a secondary coil inducing power corresponding to the current supplied to the primary coil;
   a second rectifier circuit configured to rectify the power induced by the secondary coil of the switching transformer and output the DC power; and
   a control circuit including a photocoupler configured to feed back a signal from a secondary side to a primary side in accordance with a flowing current, and configured to perform feedback control of switching operation of the switching operator so that a predetermined voltage is output from the second rectifier circuit, wherein
   the control circuit changes a ratio of a current flowing to the photocoupler to the voltage output from the second rectifier circuit depending on whether the switching power supply circuit is in the standby mode or in the power-on mode to reduce a noise of the switching transformer when the switching power supply circuit is in the standby mode and in the power-on mode,
   the control circuit includes:
      a shunt regulator determining the current flowing to the photocoupler based on a voltage obtained by dividing the voltage output from the second rectifier circuit, and
      a gain switching circuit changing the ratio of the current flowing to the photocoupler to the voltage output from the second rectifier circuit by switching a gain of the shunt regulator depending on whether the switching power supply circuit is in the standby mode or in the power-on mode, and the gain switching circuit includes:
         a first capacitor and a first resistive element connected with each other in serial, which are coupled to the shunt regulator,
         a second capacitor and a second resistive element connected with each other in serial, and
         a switch configured to switch whether or not the shunt regulator is coupled to the second capacitor and the second resistive element.

2. The switching power supply circuit of claim 1, wherein the ratio of the current flowing to the photocoupler to the voltage output from the second rectifier circuit in the standby mode is greater than that in the power-on mode.

3. The switching power supply circuit of claim 1, wherein the control circuit controls the switching operator so that a switching frequency of the switching operator is 20 Hz or less in the standby mode, and so that the switching frequency is 20 kHz or more in the power-on mode.

* * * * *